(12) United States Patent
Sundgren

(10) Patent No.: US 7,883,025 B2
(45) Date of Patent: Feb. 8, 2011

(54) GUIDE RAIL OF COMPOUND TYPE AND A METHOD FOR MANUFACTURING SUCH A RAIL

(76) Inventor: Anders Sundgren, Nyåkersvägen 40, Sunderbyn (SE) SE-950 17

( * ) Notice: Subject to any disclaimer, the term of this patent is extended or adjusted under 35 U.S.C. 154(b) by 303 days.

(21) Appl. No.: 10/583,117

(22) PCT Filed: Dec. 13, 2004

(86) PCT No.: PCT/SE2004/001850

§ 371 (c)(1),
(2), (4) Date: Aug. 22, 2006

(87) PCT Pub. No.: WO2005/059252

PCT Pub. Date: Jun. 30, 2005

(65) Prior Publication Data

US 2007/0181705 A1    Aug. 9, 2007

(30) Foreign Application Priority Data

Dec. 16, 2003    (SE) .................................... 0303395

(51) Int. Cl.
*E01B 5/00*        (2006.01)
(52) U.S. Cl. ...................................................... 238/122
(58) Field of Classification Search ................. 238/122, 238/125, 143, 148
See application file for complete search history.

(56) References Cited

U.S. PATENT DOCUMENTS 1,395,805 A    11/1921    Feibelmann (Continued)

FOREIGN PATENT DOCUMENTS

DE        598 883        6/1934

(Continued)

OTHER PUBLICATIONS

Machinery's Handbook, 25th Edition, p. 193. 1996.*

(Continued)

*Primary Examiner*—S. Joseph Morano
*Assistant Examiner*—Robert J McCarry, Jr.
(74) *Attorney, Agent, or Firm*—Nixon & Vanderhye P.C.

(57) ABSTRACT

The invention concerns a guide rail of compound type and a method of manufacturing such a guide rail. The guide rail is made like a railway rail or similar and intended for guiding interaction with a wheel of a unit travelling along the rail, comprising a long outer rail (4) made of sheet metal exhibiting the shape of a longitudinal open channel with defined inside (9) and outside (10), a long base rail (5) exhibiting a foot (1) for mounting the rail to a surface, a web (2) extending from the foot supporting a main part (3), which, in comparison to the web, is thicker and serves as a receptacle (11) for receiving and supporting the outer rail, whereby the outer rail has an outer profile that has been chosen to provide a guiding interaction with the wheel. According to the invention, the inside (9) of the outer rail (4) and the receptacle section (11) exhibit opposing section shapes, that the outer rail (4) has a yield limit exceeding that of the base rail (5) and that both parts are joined together by adhesive binding such as welding or gluing.

18 Claims, 4 Drawing Sheets

U.S. PATENT DOCUMENTS

| | | | |
|---|---|---|---|
| 2,511,361 A * | 6/1950 | McQuaid et al. | 238/143 |
| 4,889,281 A * | 12/1989 | Hung | 238/143 |
| 5,047,595 A * | 9/1991 | Hartland | 191/22 DM |
| 5,251,732 A | 10/1993 | Bruning | |
| 5,645,653 A | 7/1997 | Jerath et al. | |
| 6,536,104 B2 * | 3/2003 | Pelletier | 29/831 |
| 6,557,775 B1 * | 5/2003 | Brinson et al. | 238/10 R |
| 6,870,294 B2 * | 3/2005 | Holzheu et al. | 310/201 |

FOREIGN PATENT DOCUMENTS

| | | |
|---|---|---|
| DE | 33 19 182 | 11/1984 |
| DE | 196 13 719 | 11/1997 |
| GB | 2 231 544 A | 11/1990 |

OTHER PUBLICATIONS

International Search Report for PCT/SE2004/001850 dated Mar. 11, 2005.

Office Action issued by the European Patent Office for corresponding EP Application No. 04 820 551.2-2302, mailed Feb. 17, 2009, 6 pages.

European Agent's Response to Office Action for corresponding EP Application No. 04820551.2, filed Apr. 27, 2009, 7 pages.

Lindunger et al., Jernkontorets Forskning D 812, "Steel and Aluminum—A comparison of material properties, LCI and recycling", Aug. 16, 2004, 7 pages, with one page of relevant translation.

Talat "Definition and Classification of Mechanical Fastening Methods" Issued 1994 of EAA—European Aluminium Association.

* cited by examiner

GUIDE RAIL OF COMPOUND TYPE AND A METHOD FOR MANUFACTURING SUCH A RAIL

This application is the US national phase of international application PCT/SE2004/001850 filed 13 Dec. 2004, which designated the U.S. and claims priority to SE 0303395-8 filed 16 Dec. 2003, the entire contents of each of which are hereby incorporated by reference.

The present invention concerns a guide rail of compound type according to the preamble to claim 1 and a method of manufacturing such a guide rail according to the preamble to claim 18.

Increasingly greater demands are being put on the wear resistance and durability of the type of guide rails that through interaction with wheels or rollers are used to guide units that can be driven along the guide rails, e.g. the wagons and locomotive of a train. Amongst other things, this hereby puts demands on parts of the rails with which the wheels interact being able to withstand long periods of use without exhibiting so-called surface fatigue and subsequent cracking. Furthermore, there are demands that the guide rails should withstand distortion and wear and that so-called micro-pitting cannot form on the running surfaces of the rails because the said pitting both impairs the service life of the trains and reduces passenger comfort. When it concerns the type of guide rails that form part of a railway track, it has been shown to be difficult to meet with these demands because there are endeavours being made to run trains increasingly faster, which means the wheels also roll faster on the rails. Trains are getting increasingly heavier at the same time as rain and pollution are exerting the rails to increasingly more severe attacks of corrosion.

On previously known rails of so-called compound type, i.e. rails comprising a base rail with a durable outer rail applied to it, the outer rail has usually been applied to the base rail through plastic deformation after assembly. Normally, this is achieved through distorting parts of the outer rail or exposing it to similar plastic processing so that the rail in an enveloping manner is fixed to a receptacle section of the base rail.

The disadvantage of the said technique is obvious when outer rails of high-strength, hardened, material or material with high tensile yield and consequently high durability are to be applied to the base rail because such material can only be shaped with much difficulty. Even if the enveloping adhesion obtained in this way between the outer rail and the base rail is very good to begin with, it does tend to loosen after a certain time of use, which often results in rattling and noise from the guide rails.

One object of the present invention is therefore to achieve a guide rail that is simple and easy to manufacture and exhibits better properties with regard to both wear resistance and resistance to surface fatigue. It is also desirable to achieve a guide rail possessing a dampening effect and is thereby considerably quieter than currently known rails.

The said objects of the invention are achieved by means of a guide rail exhibiting the distinctive features specified in claim 1 and a method of manufacture exhibiting the distinctive features specified in claim 17.

From one point of view, the invention is based on a guide rail arranged as a base rail intended to receive and support a complementary outer rail possessing and especially high resistance to wear, which makes the complete guide rail less sensitive to wear. The complementary outer rail is fixed to the base rail by means of methods of adhesive bonding such as gluing or welding and has been given such a form that the form is essentially unchanged once it has been mounted on the base rail. This can be applied to the modification of an existing guide rail already in place such as a railway track resting on sleepers or guide rails of new manufacture intended for any other application where the rail is exerted to especially high levels of strain and wear. From another point of view of the invention a basic rail with an outer rail of suitable shape are arranged during manufacture.

Other distinctive features and advantages of the invention will be seen in the following description of one embodiment with reference to attached drawings, of which FIG. 1 shows a perspective of a guide rail according to the invention with an outer rail arranged on a base rail whereby the duly formed guide rail has the form of a normal railway rail with a foot intended for mounting to a sleeper.

Figure 1:
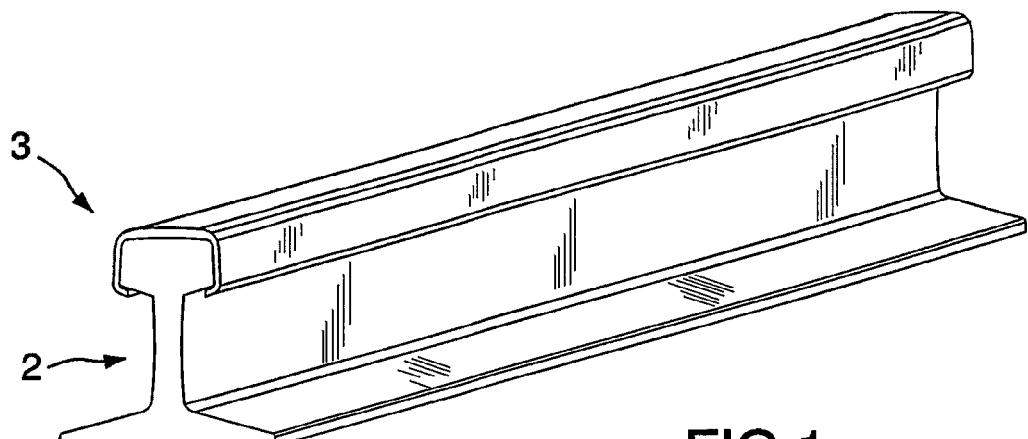

FIG. 1 illustrates an example of a guide rail according to the invention, which in this case constitutes a so-called railway rail generally comprising a foot 1, web 2 and main part 3.

Figure 2:
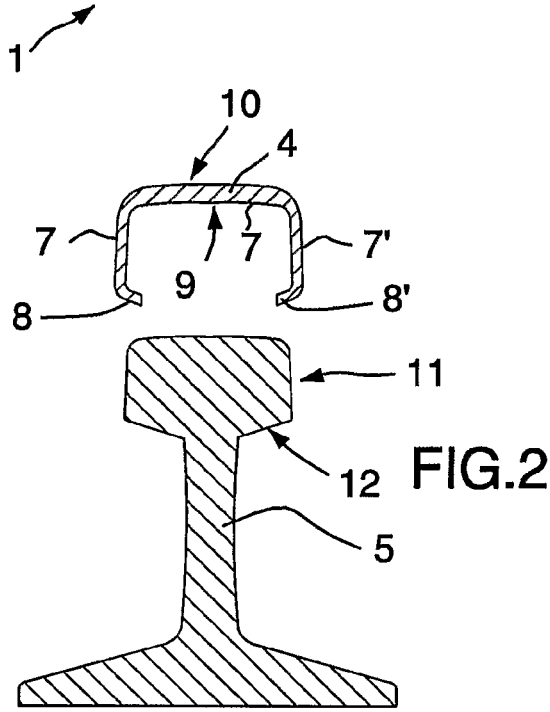
FIG. 2 is a cross section of the guide rail shown in FIG. 1 with the parts separated.
Figure 3:
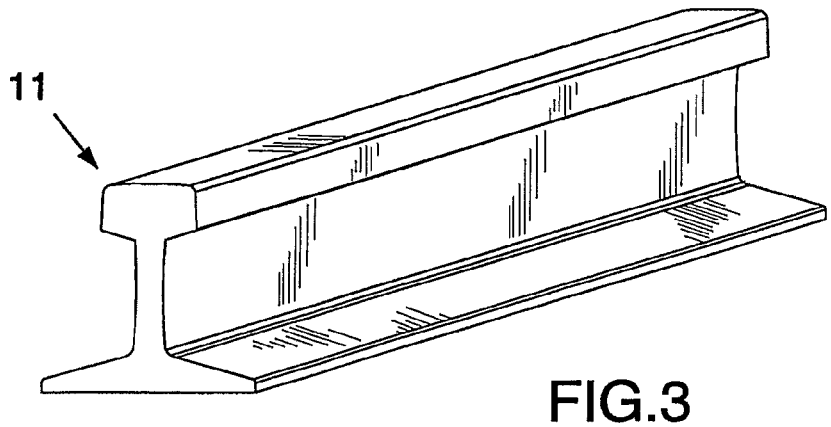
FIG. 3 shows a perspective view of a normal railway rail that has been prepared to receive an outer rail to form a base rail.

Referring to FIGS. 2 and 3, the guide rail according to the invention is mainly made up of two parts; a first part 4, which in this case comprises a separate outer rail of metal sheet of limited or relatively small thickness, and a second part 5, which in this case comprises a base rail. The expression base rail is in the following to denote an element made from a beam, rod or similar thick and solid material that has been prepared to receive an outer rail 4 by means of a process stage subsequent to rolling. In new manufacture, the base rail can be given the required shape initially in the rolling process. Through the said preparatory stages, the outer rail 4 and the base rail 5 are given such a shape that the relatively thinwalled outer rail 4 can be received without deformation and supported by the base rail 5 in the way shown in FIG. 1.

The expression "small thickness" has not been defined as long as it is not put in relation to any other dimension and the said expression, as used here, concerns principally a material thickness suitable for rollforming sections in which the normal material thickness is in the interval 1-10 mm. Rolling is another possible alternative shaping or profiling method for manufacturing an outer rail with the desired form.

The outer rail 4 is shaped like an open channel along its length where the cross section of the accordingly shaped profile can be regarded as a C shape. Because of its small thickness, the outer rail can be simply and cheaply given the desired profile and thereby also given the necessary material properties regarding strength and surface hardness. In this part it should be understood that the outer rail 4 can with advantage be given its profile through rollforming in a rollformer and its strength through a subsequent hardening process. That is to say manufacturing stages including; that a piece of sheet metal is made into a suitable shape by passing between the section rollers of a roller mill, that the shaped metal is heated to the austenitising temperature of the chosen metal and that the heated section is cooled at a rate suitable for the material in question. Based on a material with relative low strength such as approximately 340 MPa, the yield point can hereby be increased to very high values of around 900-1300, usually 1200 MPa. Thanks to the relatively low initial yield point of the original material, high-strength sections of relatively complicated shapes and tight or small radiuses can be produced. Suitable materials for rollforming and hardening are different types of steel that have been alloyed with additives such as boron, i.e. boron steel. Since rollforming in combination with subsequent hardening is a well known and long applied technique, a more thorough description of this manufacturing process will not be given below.

Naturally, it is possible to make the hardened outer rail 4 even stronger by following the hardening with a tempering stage.

Seen in cross section and most evident in FIG. 2, the C-shaped outer rail 4 is defined by a bottom section 6 with adjoining side sections 7, 7', which at their free ends are terminated by end side edges 8, 8' directed towards each other. The outer rail 4 exhibits in this respect a defined concave inside 9, which is limited by an essentially flat bottom surface with mainly plane-parallel side surfaces adjoining it at right angles. The outer rail's 4 generally convex outside 10 has to all intents and purposes received its shape to offer a guided interaction with a railway wheel and has in this respect also been given a profile corresponding to that of the wheel with three mainly flat side surfaces. The said three sides include an essentially flat top and a first and a second flat outside adjoining the top at right angles.

The top of the base rail 5 has through machine cutting, which could include milling, been given a receptacle section 11 with cross section that corresponds to the roller shaped concave inside 9 of the outer rail 4.

As illustrated in FIG. 2, the thicker receptacle section 11 exhibits a transitional section 12 tapered in the direction towards the web section. When the outer rail 4 is mounted, the opposing end side edges 8, 8' are used to snap in towards the transitional section 12 so that the outer rail 4 can be elastically locked to the base rail 5. The expression elastically here means that the outer rail 4 can be locked to the base rail 5 in a stable manner by being pressed straight down towards the base rail without the outer rail suffering any permanent plastic deformation or change in shape in comparison to its original shape. That is to say, the shape of the outer rail 4 profile will remain unaffected both before and after it is mounted on the receptacle section 11. In a preferred embodiment of the invention, however, the outer rail 4 can be made somewhat smaller than the receptacle section 11 of the base rail or be arranged with snap fastening that is designed so that the outer rail is given a certain degree of application to the base rail. Hereby is obtained a better contact between the outer rail and the base rail, which is of great importance in cases when they are fixed by gluing.

In this respect, the outer rail 4 can in other words be joined to the base rail 5 at right angles to the longitudinal direction of the parts. That is to say, so that the outer rail 4 immediately and with good relative surface contact can be placed onto the receptacle section 11 of the base rail 5.

Since rolling is a method that allows the manufacture of products with relatively narrow tolerances, it should be noted that during the new manufacture of guide rails it is naturally possible through rolling only to manufacture a base rail 5 with a receptacle section 11, which allows immediate reception of the outer rail 4. That is to say, the base rail 5 can essentially be given such a form through rolling that a subsequent machine cutting stage of manufacture need not be applied.

It should hereby be realised that since rollforming, unlike rolling for example, does not offer material transfer but allows only an applied sheet metal blank to be shaped in its longitudinal direction, the receptacle section 11 of the base rail 5 must be given a continuous cross-sectional area along its length that essentially corresponds to the inside section 9 of the outer rail 4.

It should be understood that machine cutting to shape the receptacle section 11 of the base rail 5 can well be applied to existing guide rails and guide rails in use such as railway rails lying on a railway embankment. Regarding existing railway rails, this can be a case of maintenance work, reconditioning work or repair, whereby the existing guide rail through machine cutting can be prepared to form a base rail 5 to receive an outer rail 4 by arranging the said receptacle section 11.

Figure 4:
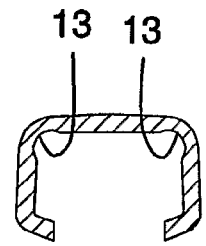
FIG. 4 shows the end view of an outer rail in an alternative embodiment with material contractions running along the rail serving as guide notches to facilitate fitting the outer rail onto the base rail.
Figure 14:
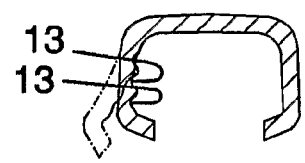
FIG. 14 shows an end view of an outer rail corresponding to FIG. 1 but in this case with material contractions arranged on one side section of the outer rail to facilitate fitting the outer rail onto the base rail.

FIGS. 4 and 14 show cross sections through outer rails 4 in alternative embodiments. To facilitate fitting the outer rail onto the receptacle section 11 of the base rail 5, the outer rail 4 in these embodiments has been given a number of material contractions 13, which, extending along the length of the concave inside of the rail, are used to locally reduce the bending resistance of the outer rail and thereby serve as guide notches allowing the side edge sections 7, 7' of the outer rail 4 to bend out when snapping the outer rail onto the base rail.

FIG. 4 shows an example of an outer rail 4 where the material contractions 13 are located in the transitional area between the bottom section 7 and its adjoining side edge sections 7, 7'.

FIG. 14 shows an example of an outer rail 4 on which the material contractions 13 like grooves are arranged in series after each other. The said material contractions 13 are formed in one side edge section 7 of the outer rail 4, whereby the C-shaped gap of the outer rail can be widened by simply bending out this side edge section in the way represented in the figure with a dotted line. The material contractions 13 should, however, be made in such a way that their negative effect on the overall strength of the outer rail is kept as low as possible. For example, it could be advantageous to apply the said series of material contractions to the side edge section of the outer rail that after fitting onto the base rail 5 forms the outside of the guide rail, i.e. the side edge section of the outer rail that does not interact with a railway wheel.

Figure 5:
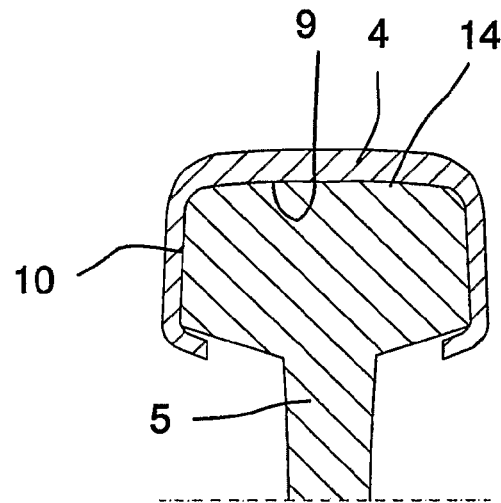
FIG. 5 shows a cross section of a guide rail made of a base rail and an outer rail.

According to the principles of the invention and with reference to FIG. 5, the outer rail 4 is fixed to the base rail 5 through the application of an adhesive binding technique that can include welding but that preferably concerns gluing, whereby glue 14 is applied to any of the opposing contact surfaces 9, 10 of the respective rails. Alternatively, the glue can be applied to each of the meeting rails' contact surfaces 9, 10. On an especially preferred embodiment of the invention, the outer rail 4 is joined with the base rail 5 through a combination of gluing and snap fastening. Thanks to the shape of the receptacle section 11 and the inside 9 of the outer rail 4 being adapted to fit each other a relatively large area of active contact surface is obtained, which offers an efficient glued joint between the outer rail 4 and the base rail 5. Consequently in this way, strong and cheap guide rails can be manufactured through the application of thin sections of outer rails 4 of strong relatively expensive material on a relatively cheap base rail 5. The problems with vibration and resonance that often arise in cases where parts are joined mechanically, such as by upsetting or bolting, can be avoided using the technique according to the invention. Problems with noise and resonance are common for all types of railway traffic.

Figure 6:
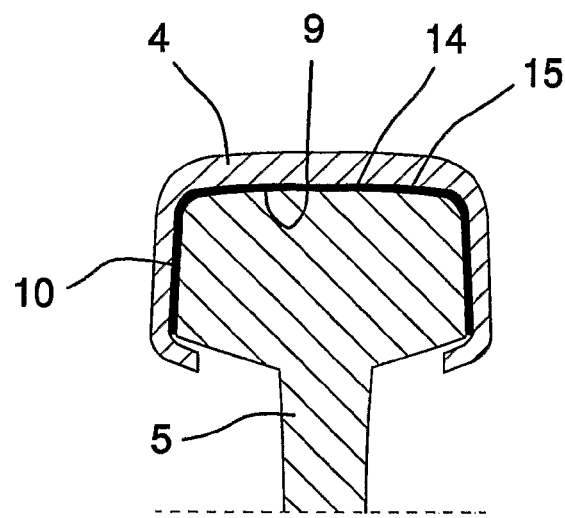
FIG. 6 shows a cross section of the guide rail shown in FIG. 5 in an embodiment with a sound absorbing filler between the outer rail and the base rail.

FIG. 6 shows an alternative embodiment of the invention whereby the aforesaid problems with noise are further reduced. For this embodiment of the invention a thin section-like filler element 15 of elastomeric material such as plastic has been applied between the two rails 4, 5 that have been joined by gluing. The said elastomeric element 15 does not necessarily need to exhibit a section corresponding to the opposing sections of the outer rail 4 and the base rail 5 respectively but in cases where a very thin and flexible material is used, it is possible for the elastomeric sectional element in its original state to have the form of a flat rectangle that is formed into shape between the two joined rails 4, 5.

Figure 7:
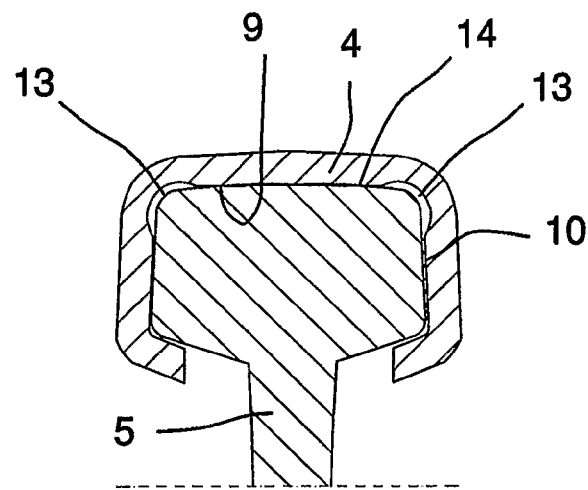
FIG. 7 shows a cross section of a guide rail made of a base rail and an outer rail of the type shown in FIG. 4.

FIG. 7 shows an example of an outer rail 4 of the second embodiment with a number of longitudinal material contractions 13 along the rail that has been applied to a base rail 5 through snap fastening.

Figure 8:
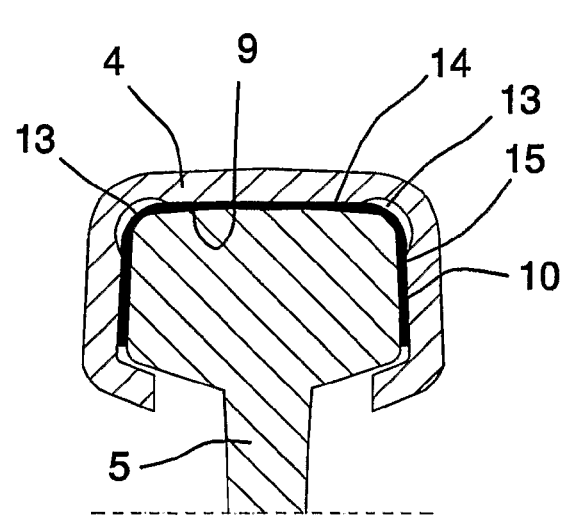
FIG. 8 shows a cross section of the guide rail shown in FIG. 7 in an embodiment with a sound absorbing filler between the outer rail and the base rail.

FIG. 8 shows an example of outer rail 4 of the second embodiment which through snap fastening to the transitional section 12 has been applied to a base rail 5, whereby a filler layer of elastomeric material 15 has been arranged between the respective rails.

Figure 9:
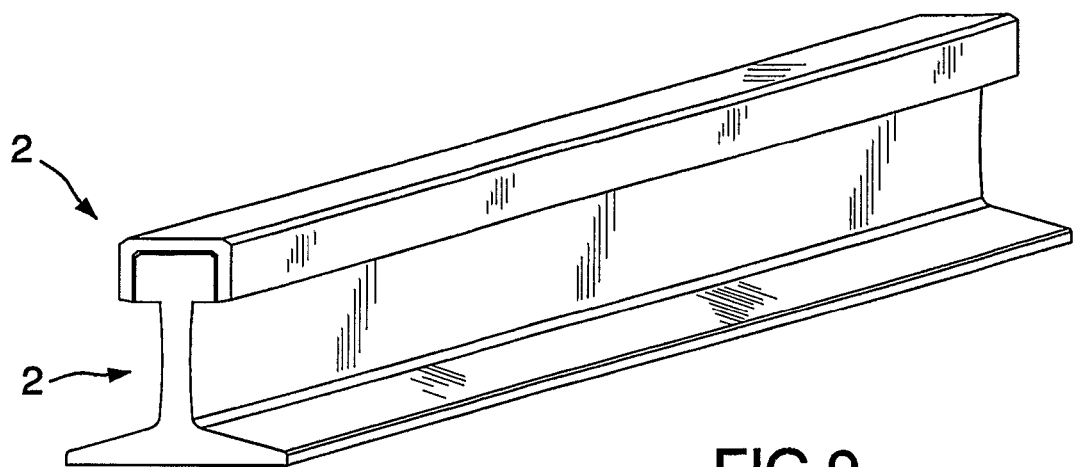
FIG. 9 shows a perspective view of a guide rail according to the invention with an outer rail of an alternative third embodiment arranged on a base rail.
Figure 10:
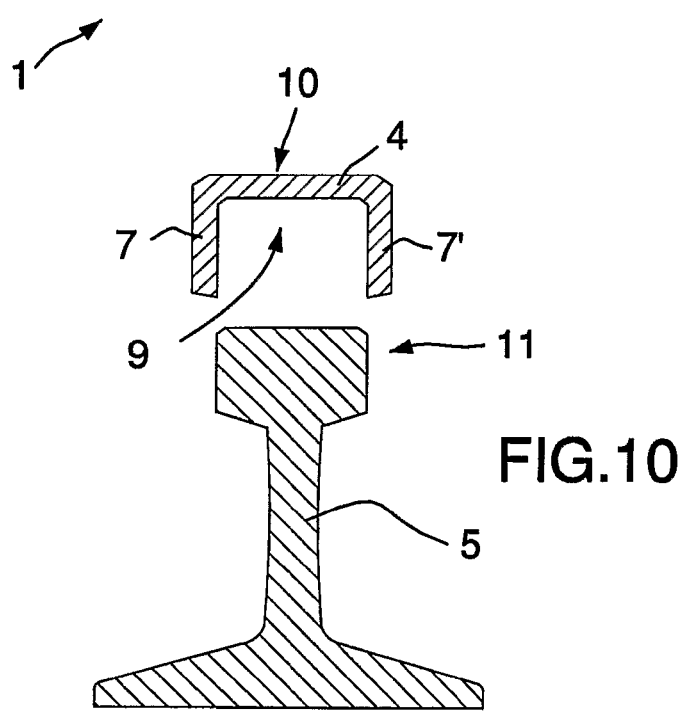
FIG. 10 is a cross section of the guide rail shown in FIG. 9 with the parts separated.
Figure 11:
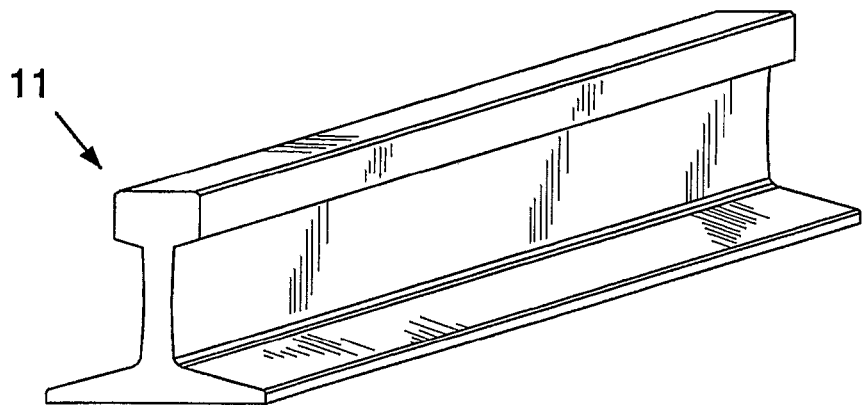
FIG. 11 shows a perspective view of a normal railway rail that has been prepared to receive an outer rail of the embodiment illustrated in FIG. 9 to form a base rail.

Referring to FIGS. 9-11, a guide rail of a third and somewhat simpler embodiment according to the invention is shown that differs from the first and second embodiments only in that the outer rail 4 does not exhibit any of the opposing end side edges 8, 8'. It should be understood that the outer rail in this embodiment is solely intended to be joined to the receptacle section 11 of the base rail 5 by means of gluing.

Figure 12:
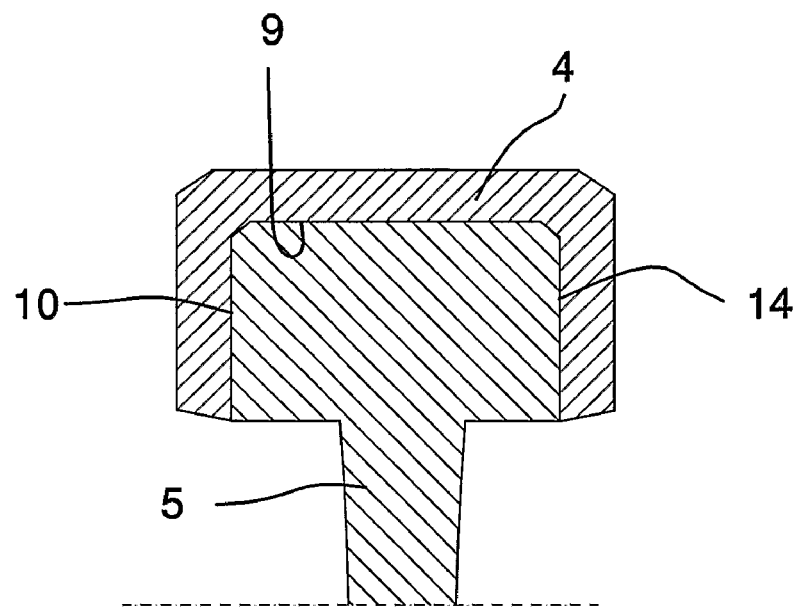
FIG. 12 shows a cross section of a guide rail made of a base rail and an outer rail of the type shown in FIG. 9.

FIG. 12 shows how the outer rail 4 of the third embodiment is fixed to the base rail 5 through gluing after the application of glue 14 on any of the opposing contact surfaces 9, 10 of the respective rails. The glue is preferably a conductor that allows current to be conveyed between the base rail and the outer rail.

Figure 13:
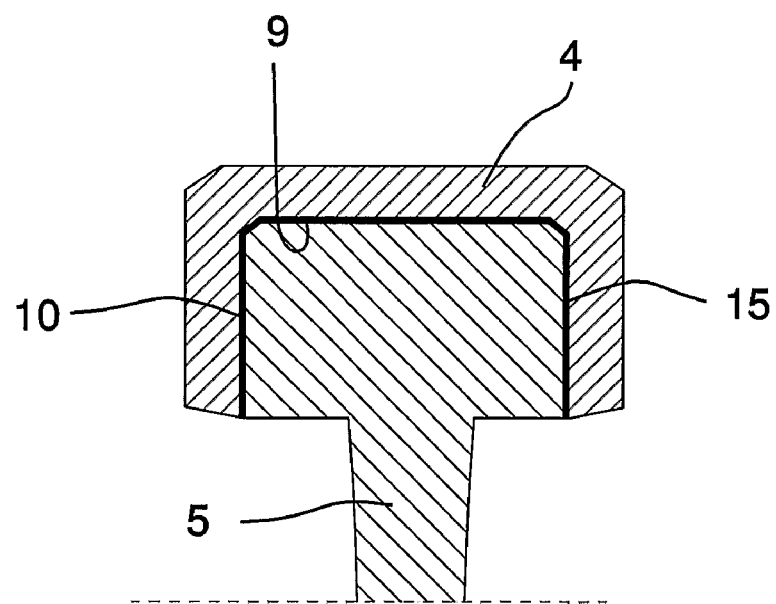
FIG. 13 shows a cross section of the guide rail shown in FIG. 12 in an embodiment with a sound absorbing filler between the outer rail and the base rail.

FIG. 13 shows an example of how a thin section-like filler element 15 of elastomeric material is applied to the meeting contact surfaces 9, 10 of the rails 4, 5 that are joined by gluing.

The invention described herein is not limited to the above description or as illustrated in the drawings but can be changed and modified in a number of different ways within the framework of the idea of invention specified in the following claims.

For example, it is possible to combine different types; that the assembled guide rail could be manufactured of different materials, of which, for new production, the thick base rail need not be made of a metal. As the outer rail and the base rail are joined by gluing, it is very likely that different types of fibre-reinforced composite materials of synthetic resin type or reinforced concrete could be used for the base rail.

The invention claimed is:

1. Guide rail of compound type for guiding interaction with a wheel of a unit travelling along the rail, the guide rail comprising an outer rail made of sheet metal exhibiting the shape of a longitudinal open channel with defined inside and outside, a base rail exhibiting a foot for mounting the rail to a surface, a web extending from the foot supporting a main part, which, in comparison to the web, is thicker and serves as a receptacle section for receiving and supporting the outer rail, whereby the outer rail has an outer profile that has been chosen to provide a guiding interaction with the wheel, the inside of the outer rail and the receptacle section of the base rail exhibit corresponding sections or sections that have been chosen relative to each other so that the outer rail fits onto the receptacle section, wherein the outer rail has a yield point exceeding that of the base rail and wherein both the outer rail and the base rail are fixed adhesively to each other by a glue joint, whereby the outer rail and base rail respectively are joined to each other with a combination of glue and mechanical snap fastening and a certain degree of application to the base rail through the effect of a snap fastener portion formed in the outer rail, whereby the outer rail seen in cross section is essentially C-shaped exhibiting a bottom section and two adjoining side edge sections, the free end side edges of which are opposing to form a snap fastener portion and intended when the outer rail is fitted to snap in place on a transitional section that viewed from the main section tapers off towards the web, and whereby the outer rail on its concave inside has longitudinal material contractions serving as guide notches.

2. Guide rail according to claim 1, whereby the material contractions are located in the transitional area between the bottom section and its adjoining side edge sections.

3. Guide rail according to claim 1, whereby the material contractions are located in any one of the side edge sections adjoining the outer rail.

4. Guide rail according to claim 3, whereby the material contractions arranged in any of the side edge sections are positioned in series after each other like grooves.

5. Guide rail of compound type for guiding interaction with a wheel of a unit travelling along the rail, the guide rail comprising an outer rail made of sheet metal exhibiting the shape of a longitudinal open channel with defined inside and outside, a base rail exhibiting a foot for mounting the rail to a surface, a web extending from the foot supporting a main part, which, in comparison to the web, is thicker and serves as a receptacle section for receiving and supporting the outer rail, whereby the outer rail has an outer profile that has been chosen to provide a guiding interaction with the wheel, the inside of the outer rail and the receptacle section of the base rail exhibit corresponding sections or sections that have been chosen relative to each other so that the outer rail fits onto the receptacle section, wherein the outer rail has a yield point exceeding that of the base rail and wherein both the outer rail and the base rail are fixed adhesively to each other by a glue joint, whereby a layer of elastomeric material is arranged between the outer rail and the base rail in which the said parts are joined together through glue.

6. Guide rail in accordance with claim 5, whereby the elastomeric filler layer comprises a polymeric material.

7. Method of manufacturing a guide rail of compound type for guided interaction with a wheel of a unit travelling along the rail, the method comprising:

profile shaping a first sheet metal blank, forming a channel-shaped outer rail with a defined concave inside and a convex outside, the shape of the outside of which is chosen to provide a guided interaction with the wheel, forming a base rail from a second blank exhibiting a foot for fitting the rail to a surface, a web that extends from the foot and supports a main section, which in comparison to the web is thicker and serves as a receptacle of suitable shape to support the outer rail, providing the outer rail with a higher yield point compared to the base rail through hardening, positioning the hardened outer rail on the receptacle formed on the base rail, and adhesively fixing the hardened outer rail on the receptacle formed on the base rail by gluing or welding.

8. Method according to claim 7, whereby the outer rail is given such a shape in relation to the base rail that the outer rail can be snapped onto the receptacle section of the base rail.

9. Method according to claim 7, whereby the outer rail on its inside has longitudinal material contractions serving as guide notches.

10. Method according to claim 7, whereby a layer of elastomeric material is arranged between the outer rail and the receptacle section of the base rail and that the outer rail, base rail and filler layer are joined together through gluing.

11. Method according to claim 7, whereby the outer rail is manufactured by rollforming and passing between two rollers in a section rolling mill.

12. Method according to claim 11, whereby the outer rail after rollforming is hardened through heating the material to a suitable austenitising temperature and then cooling it at a rate that is suitable for the material.

13. Method according to claim 11, whereby the outer rail is manufactured by rollforming a sheet metal material that has a yield limit below 340 MPa.

14. Method according to claim 7, whereby the outer rail after shaping is hardened so it exhibits a yield limit that at least attains values in the interval 900-1300 MPa.

15. Method according to claim 7, whereby the outer rail is shaped through rolling.

16. Method according to claim 7, whereby the hardened outer rail is made tougher through annealing.

17. Method according to claim 7, whereby the base rail is manufactured from an existing or used railway rail of common type in which the receptacle section is made by machine cutting the rail.

18. Method according to claim 7, whereby the base rail is manufactured of a non-metallic material such as a reinforced composite material of synthetic resin type.

* * * * *